United States Patent [19]

Ishikawa et al.

[11] Patent Number: 5,021,902
[45] Date of Patent: Jun. 4, 1991

[54] TAPE CHANGER FOR LOADING AND UNLOADING A MAGAZINE OF MAGNETIC TAPE CARTRIDGES

[75] Inventors: Masatoshi Ishikawa, Odawara; Kozo Fujita, Gotenba; Shigeyuki Kobata, Odawara, all of Japan

[73] Assignee: Hitachi, Ltd., Tokyo, Japan

[21] Appl. No.: 311,343

[22] Filed: Feb. 15, 1989

[30] Foreign Application Priority Data

Feb. 17, 1988 [JP] Japan .................................. 63-32771
Feb. 17, 1988 [JP] Japan .................................. 63-32772

[51] Int. Cl.$^5$ ............................................. G11B 15/68
[52] U.S. Cl. ...................................... 360/92; 360/91; 414/331
[58] Field of Search ...................... 360/96, 92, 94, 69, 360/90-91; 414/32, 93, 95, 92; 271/212

[56] References Cited

U.S. PATENT DOCUMENTS

| 3,650,413 | 3/1972 | Weigel | 360/92 |
| 3,836,154 | 9/1974 | Ishikawa | 360/92 |
| 4,622,610 | 11/1986 | Makigawa | 360/92 X |
| 4,835,634 | 5/1989 | Ostwald | 360/92 |

FOREIGN PATENT DOCUMENTS

| 2511509 | 9/1975 | Fed. Rep. of Germany. | |
| 3714559 | 11/1987 | Fed. Rep. of Germany. | |
| 58-121172 | 7/1983 | Japan | 360/92 |
| 60-50740 | 3/1985 | Japan. | |
| 61-79856 | 5/1986 | Japan. | |
| 63-241755 | 10/1988 | Japan | 360/92 |

Primary Examiner—A. J. Heinz
Assistant Examiner—Alfonso Garcia
Attorney, Agent, or Firm—Fay, Sharpe, Beall, Fagan, Minnich & McKee

[57] ABSTRACT

A magazine in which a plurality of cartridges are contained as vertically moved stepwise by a distance separating two successive ones of the cartridges. The lift has a plurality of lift steps alternately engaged by a latching member. A rotary disk having two pins on its face is arranged adjacent the latching member. During rotation of the disk, one of the pins pivots the latching member out of engagement with a lift steps while the other of the pins supports the disengaged lift step to raise or lower the lift, depending upon the rotational direction of the disk. Further rotation of the disk permits the spring biased latching member to pivot back into a path where it engages the next lift step, thereby accomplishing one step of movement of the lift. Each time the lift is moved by one step, a pinch roller arrangement detects whether a cartridge is in the magazine corresponding to the position currently aligned with the inlet/outlet of the tape changer. If a cartridge is present, then the pinch rollers move the cartridge to load it into a magnetic tape unit, otherwise the lift is moved by another step, and the presence of a cartridge at the new position is detected. In this way, all of the cartridges present in magazine are sequentially loaded into the magnetic tape unit and after being ejected from the magnetic tape unit are loaded back into the magazine.

29 Claims, 10 Drawing Sheets

FIG. 1
FIG. 2
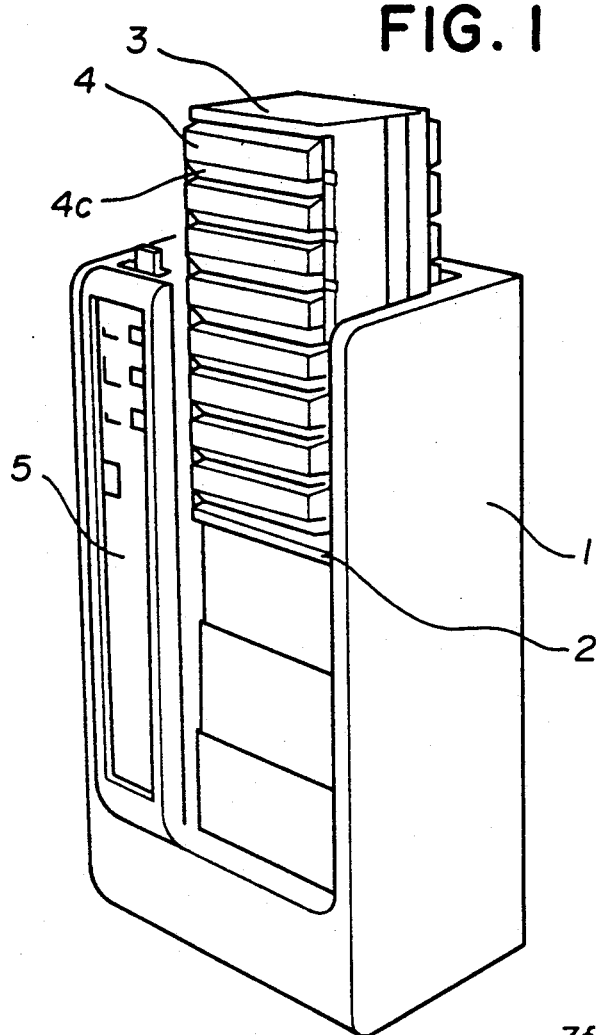
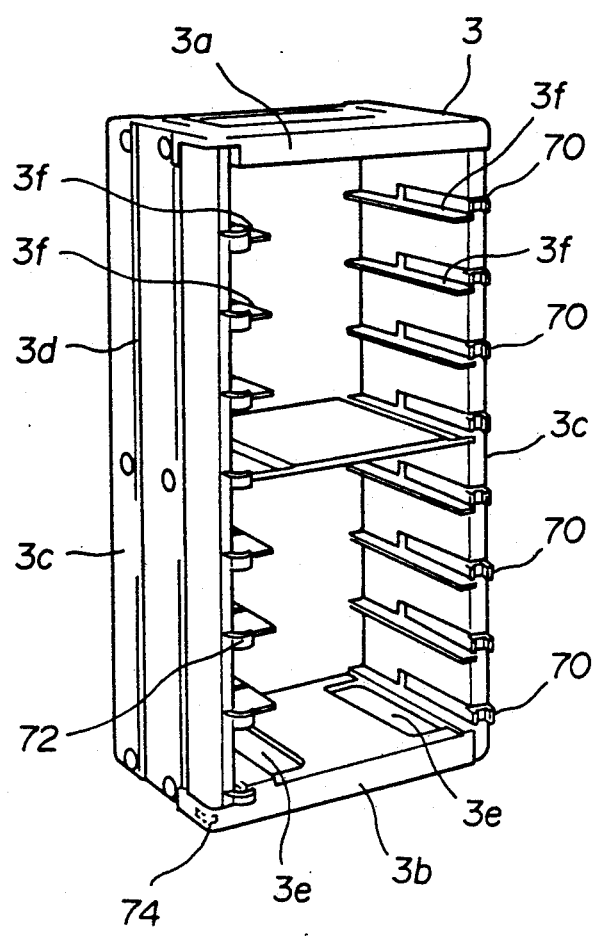

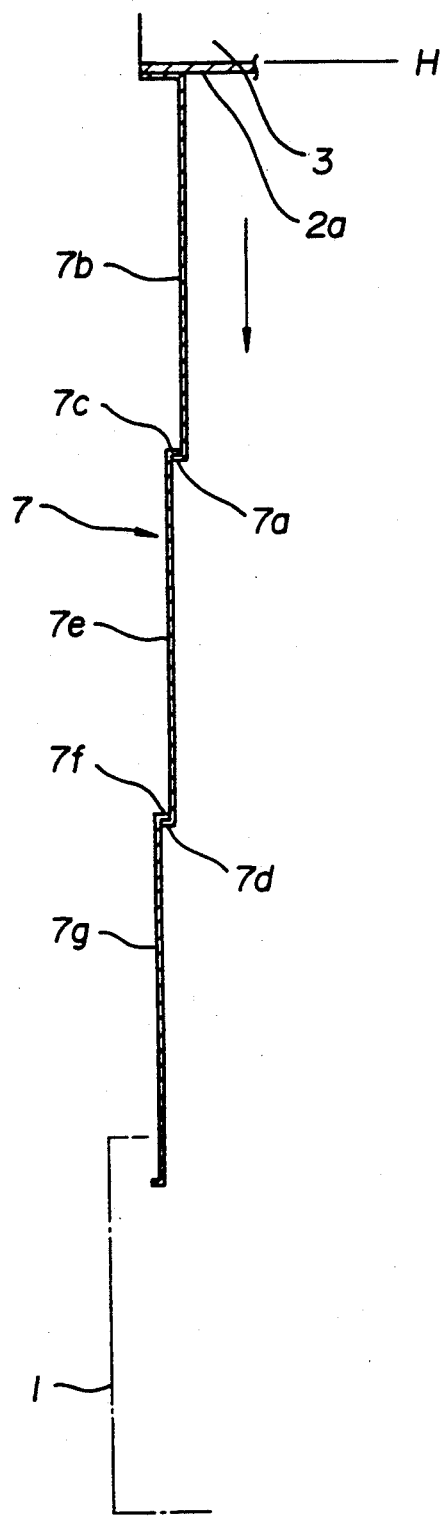
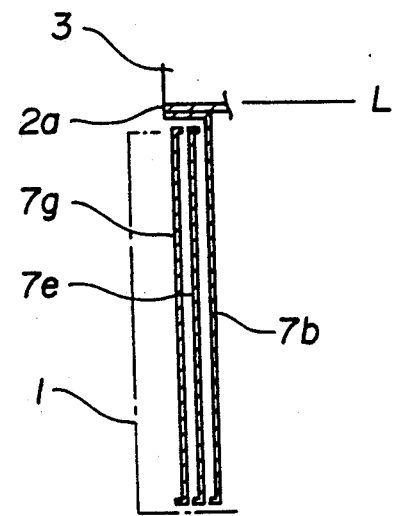
FIG. 14 (A)
FIG. 14 (B)

TAPE CHANGER FOR LOADING AND UNLOADING A MAGAZINE OF MAGNETIC TAPE CARTRIDGES

BACKGROUND OF THE INVENTION

1. FIELD OF THE INVENTION

The present invention relates to a cartridge-type magnetic tape changer in which one of a plurality of cartridge-type magnetic tapes contained in a magazine is loaded from the magazine into a magnetic tape unit and, after being ejected from the magnetic tape unit, is loaded back into the magazine.

2. DESCRIPTION OF RELATED ART

For recording desired information onto a magnetic tape ("MT" hereinafter) with a MT unit or reproducing the information recorded on an MT with the MT unit, a cartridge-type magnetic tape (hereinafter "cartridge") is loaded into the MT unit or taken out of the MT unit manually by an operator. To load/unload multiple cartridges sequentially for data or information recording or reproduction, cartridge changers have recently been proposed that have a magazine containing multiple cartridges. Such cartridge changers are designed so that a certain one of the cartridges selected among the multiple cartridges contained in the magazine can be automatically loaded into the MT unit, and after being ejected from the MT unit, can be automatically returned into the same place in the magazine. One of these type of cartridge changers is disclosed in, for example, Japanese Unexamined Patent Publication No. 60-50740. According to this type of changer, the magazine has a plurality of cartridges that is fixed on a belt that extends between a drive roller and a driven roller, and the magazine is sequentially moved by the belt as the drive roller is driven in stepwise movement by a roller gear type transmission mechanism. The magazine is driven by the belt to a predetermined position at which one of the cartridges in the magazine is loaded into the MT unit. Problems, including belt slipping, elongation of the belt and the like lead to a possible failure in accurate positioning of the magazine. Further, the belt deteriorates over time so that there is a possibility of belt failure.

In the cartridge changers of the aforementioned type, a device is provided for detecting whether or not a certain one of the cartridges in the magazine is at the position in which it is to be loaded into the MT unit. Once it is in this position, the cartridge is loaded into the MT unit. Whether the cartridge is at the loading position or not can be detected by photoelectric detecting methods, for example. One such method is known from Japanese Utility Model Unexamined Publication No. 61-79856. In implementing this method, however, the length of the optical path between the light emitter and the photodetector of the photoelectric sensor must be larger than the length between the lateral sides of the cartridge. This is disadvantageous in that it is difficult to adjust the alignment between a light emitter and photodetector spread this far apart, and therefore the device is likely to malfunction.

Cartridge changers of the known type suffer from a further disadvantage in that while a certain selected cartridge is being automatically loaded and unloaded with respect to the MT unit, the operator cannot take out or replace any of the other cartridges from the magazine. Moreover, any cartridge not set in the magazine, but set directly into the cartridge changer, cannot be automatically supplied into the MT unit. Therefore, the cartridge-type magnetic tape changers of the prior art are inconvenient for an operator's use.

SUMMARY OF THE INVENTION

The present invention has an object to overcome the above-mentioned drawbacks of the conventional techniques by providing a cartridge changer in which a certain cartridge selected from multiple cartridges contained in the magazine can be easily and correctly positioned at a predetermined position wherein the cartridge is loaded into the MT unit and loaded back into the magazine from the MT unit at the same position in the magazine, after being ejected from the MT unit. The present invention has another object to provide a cartridge changer in which it can be determined whether or not a cartridge is present in the magazine at the predetermined position aligned with the inlet of the MT unit for being loaded into the MT unit. The device for detecting whether or not the cartridge is present at the predetermined position is interconnected with the movement of a lift that drives the magazine in stepwise vertical movement.

The present invention has yet another object to provide a cartridge changer that permits free replacement, by the operator, of the cartridges in the magazine even when the cartridge changer is in operation, and also an automatic supply or take-up of a single cartridge in a magazine.

These and other objects and advantages of the present invention will be better understood from the description made, by way of example, of the embodiment of the present invention with reference to the drawings.

BRIEF DESCRIPTION OF THE DRAWINGS

FIG. 1 is a schematic perspective view showing the cartridge change according to the present invention;

FIG. 2 is perspective view, enlarged in scale, of the magazine containing a plurality of cartridges;

FIG. 14(A) and (B) are partial schematic views of the front cover of the magazine.

DETAILED DESCRIPTION OF THE PREFERRED EMBODIMENT

Figure 3:
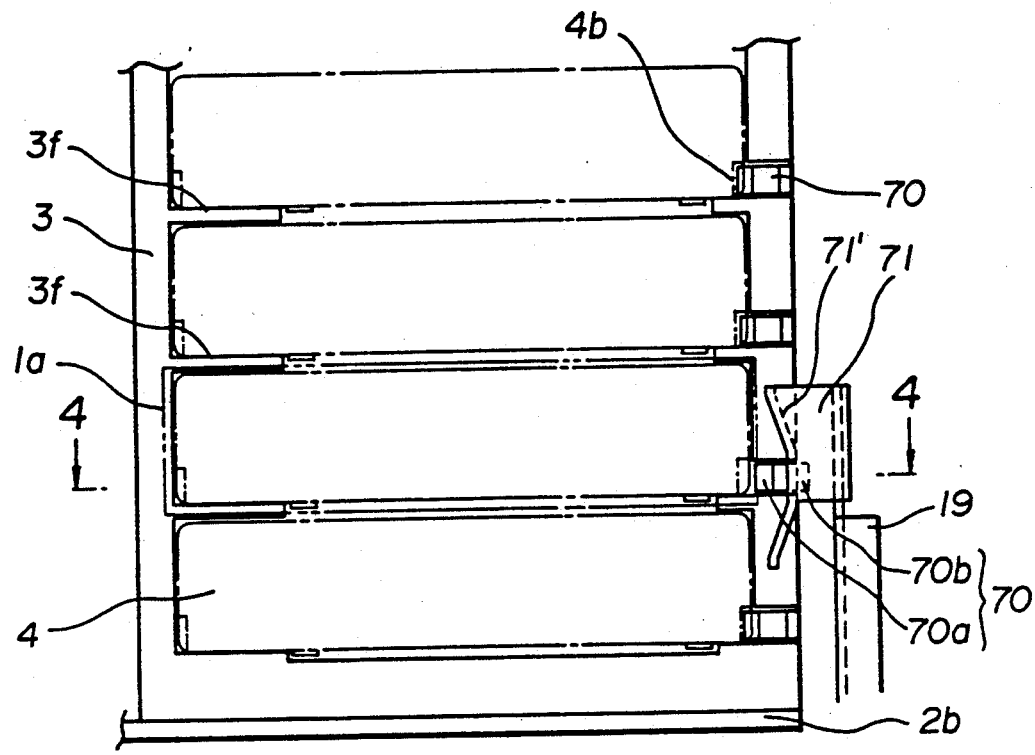
FIG. 3 is a rear view, partially enlarged in scale, of the magazine shown in FIG. 2.

FIG. 1 schematically shows the cartridge changer having a casing 1 and a vertically movable lift 2. Lift 2 receives a magazine 3 having a plurality of cartridge-type magnetic tapes 4 ("cartridges" hereinafter).

The cartridge changer has a start switch on a control panel 5 provided on the front of the casing 1 that starts the vertical movement of the lifting mechanism, described in further detail herein. The lifting mechanism vertically moves the lift 2 to a position of a predetermined height. At this position one of the cartridges 4 set in the magazine 3 is generally horizontally moved toward a magnetic tape unit ("MT unit" hereinafter) by a device for moving the cartridge horizontally. Alternatively, a cartridge 4 ejected from the MT unit is loaded back into the magazine 3 at the same position.

As shown in FIG. 2, magazine 3 has a top plate 3a, bottom plate 3b and a pair of side plates 3c connected to the top plate 3a and bottom plate 3b. The magazine has a framework open at both the front and rear sides thereof. As shown from the illustration enlarged in scale in FIG. 3, each of the side plates 3c has regularly spaced rack plates 3f for receiving the cartridges in a horizontal orientation. Cartridges 4, for example, are of the type that house a ½ inch magnetic tape used for recording/reproduction in electronic computers. Preferably, magazine 3 has a predetermined size so that the front and rear ends of the cartridges 4, when supported on the respective rack plates 3f of the magazine 3, are exposed at the front and rear openings of the magazine, as shown in FIG. 4.

Lift 2, which receives magazine 3, has a lift base 2a and a magazine mount 2b fixed to the lift base 2a and split in two sections. The magazine is mounted on the lift base 2a when the lift base 2 is at its highest position along a vertically extending track (hereinafter referred to as the "home position"). At the home position, the front end of the cartridge 4 supported or set on the lowermost rack plates 3f of the magazine is opposite to an opening 1a formed in the back of the casing 1, through which the cartridge is passed into and taken out of the MT unit. The lift base 2a has an actuator 6a which is actuated by the magazine 3 when it is loaded onto the lift 2. Further, there is provided a photosensor 6b on the inner surface of the side wall of the casing 1 that detects when the actuator 6a is actuated. Thus, it is detected by the photosensor 6b whether or not magazine 3 is loaded on board lift base 2a. Also, another photosensor 6c is disposed on the inner surface of the side wall of the casing 1 to detect when the lift base 2a is at the home position.

The magazine mount 2b of lift 2 has a pair of protrusions 2c having a predetermined width and height that extend along the side wall of the casing 1. Also, there is a longitudinally extending side plate 18 fixed on either side of the lift base 2a. The bottom plate 3b of the magazine has a pair of cuts 3e formed therein of such a size and shape to receive the protrusions 2c. Preferably, the height of the protrusions 2c is such that when the magazine 3 is loaded on board lift 2, the end faces of the protrusions 2c are substantially flush with the surface of the bottom plate 3b. Also, the spacing between the pair of protrusions 2c is preferably substantially equal to the width of the cartridges 4. Namely, in this embodiment, either the cartridge 4 can be set in the magazine 3 and loaded on the lift 2, or the cartridges can be loaded on lift 2 directly. This means that for loading a plurality of cartridges 4 into the MT unit for recording or reproduction, the operator does not always have to use the magazine 3. A single cartridge just placed on the end faces of the protrusions 2c can be fed into the MT unit.

Figure 7:
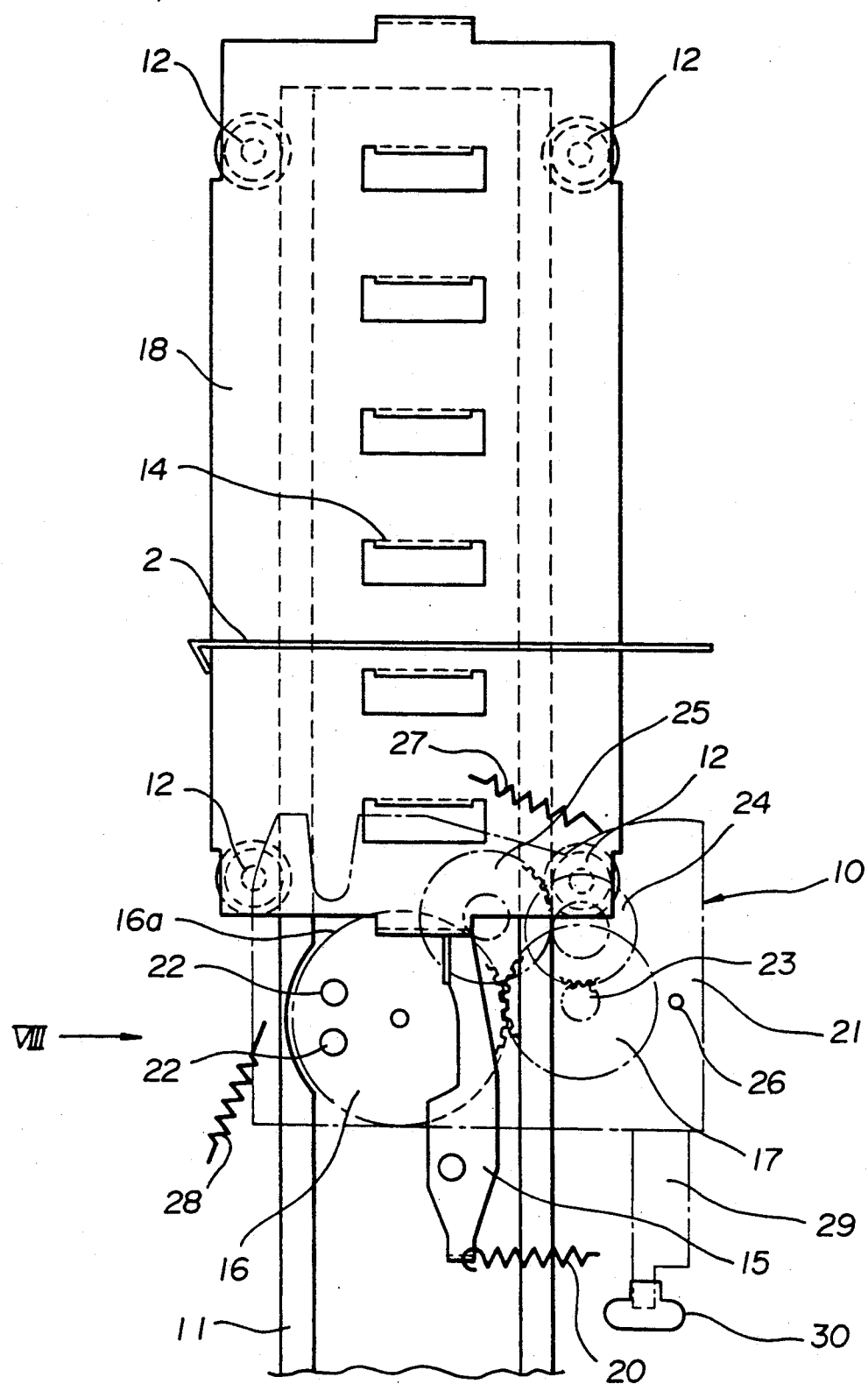
FIG. 7 is a schematic side elevation of the magazine lift shown in FIG. 6.
Figure 10:
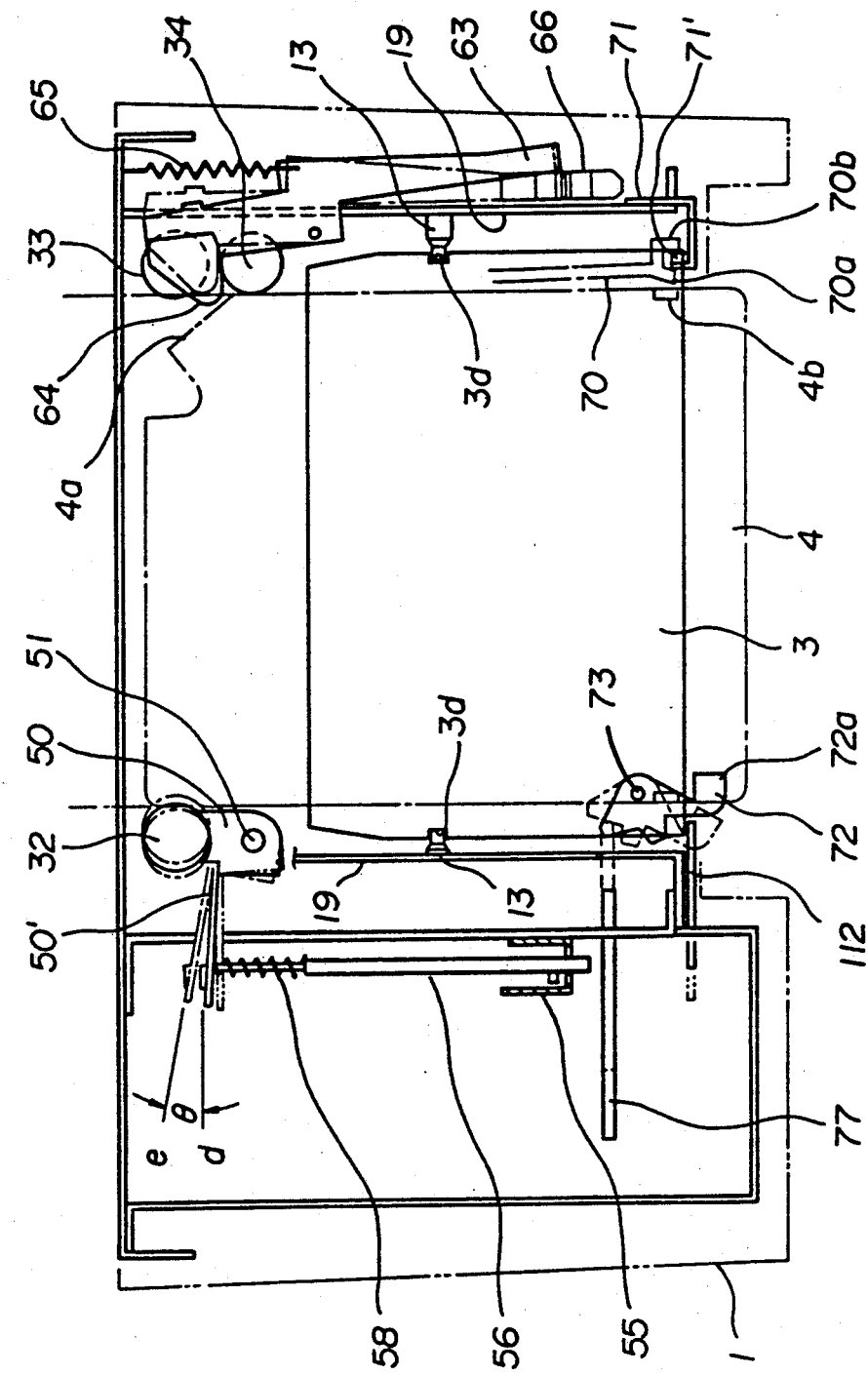
FIG. 10 is a schematic plan view of the cartridge changer, showing various detectors and locks disposed near the inlet/outlet of the changer.

Lift 2 has a pair of rollers 12 rotatably supported at their upper and lower portions, respectively, of each of the side plates 18, as shown in FIG. 7. Each roller 12 rolls on rail 11, which is formed along the moving track of the lift base 2a in casing 1. Also, a guide plate 19 is provided at a position further inside the side plate 18 of the lift 2. Guide plate 19 has a pair of protrusions 13 extending nearly horizontally, as shown in FIG. 10, that are engaged in elongated recesses 3b, respectively, formed in the outer side of the magazine 3. Thus, the magazine 3 is moved and guided in a direction along the elongated recesses 3b as the lift 2 moves vertically.

Next, the lifting mechanism for moving the lift 2 vertically is described as follows. The lifting mechanism has a plurality of lift steps 14 that protrude generally horizontally an outwardly from side plate 18 of lift 2. Lift steps 14 have a pitch equivalent to the distance between two successive ones of the multiple cartridges 4 or two successive rack plates 3f of the magazine 3. A releasable latching member 15 engages lift steps 14 and supports the lift base 2a of the lift. A rotary disk 16 is supported by a plate member 21, attached to the casing 1 with a pin 26, located within the moving track of the lift step 14. Rotary disk 16 has a gear 16a along a circumferential portion thereof, and has a pair of pins 22 protruding outwardly from one of the side faces thereof. A drive motor 17 rotates the rotary disk 16 through a power transmission.

To move the lift base, rotary disk 16 rotates through a predetermined angle of rotation causing one of the pins 22 to engage the lower side of one of the lift steps 14 and raise or lower the lift step, while the other of the pins engages and moves latching member 15 away from engagement with the lift step. After the rotary disk has rotated through the predetermined angle of rotation, the lift step supported by one of the pins is lowered by one step or one pitch, and the other pin disengages from the latching member to allow the latching member 15 to engage a next lift step.

Latching member 15 is rotatablY supported on casing 1, and is forced by a coil spring 20 in a direction in which it engages lift steps 14. As the pair of pins 22 rotate about the axis of rotation of the rotary disk 16, at least one of the pins 22 engages latching member 15 to rotate the latching member in a direction opposite to that of the application of the force of coil spring 20. This causes the latching member to be disengaged from the lift step 14, as stated above.

The power transmission coupling the rotary disk 16 and the drive motor 17 includes a gear 23 fixed on the output shaft of the drive motor 17, a first gear 24 in mesh with the gear 23 and a second gear 25 in mesh with the first gear 24 and also with a gear 16a formed on the rotary disk 16. All of the gears are mounted on a plate member 21. The power transmission gears work together to form a speed reducer group. When the drive motor 17 drives rotary disk 16, the lift 2 moves vertically at a speed corresponding to the speed of the drive motor and in a direction corresponding to the direction of rotation of the drive motor.

Plate member 21, which supports rotary disk 16, drive motor 17 and the group of power transmission gears 23, 24 and 25, is rotatably supported on the casing 1 with a pin 26, as shown in FIG. 7. Also, two coil extension springs 27 and 28 resiliently support the plate. When a load larger than that required for vertical movement of the lift base 2a is applied to the plate member 21, the resilient support of the plate attained by the coil springs 27 and 28 is disturbed so that the plate member 21 pivots about pin 26. A flag 29 that is normally positioned between the light emitter and photodetector of a photosensor 30 so that it will not be actuated is mounted in plate member 21. When the plate member is pivoted by the result of a large load being applied, flag 29 moves out of alignment with the light emitter and photodetector to thus activate the photosensor 30. This causes drive motor 17 to be stopped and the lift base 2a from being moved vertically.

Once one of the cartridges 4 in magazine 3 is moved vertically to a position at which the cartridge is in alignment with the inlet/outlet 1a of the changer, a device for moving the cartridge horizontally is activated. The device has a set of rotatable pinch rollers 32, 33 and 34 disposed at positions on either side of the inlet/outlet opening 1a formed in the front panel of the casing 1. The pinch rollers, therefore, can contact the side faces of the cartridge 4 that is positioned in alignment with the inlet/outlet opening. A drive motor 35 is disposed on a mount base 36 fixed at the lower portion of the casing 1 for rotating the pinch rollers 32, 33 and 34 simultaneously through a power transmission mechanism.

As shown in FIG. 10, pinch roller 32 is in a position where it is in contact with a side face of cartridge 4 at the left side of the cartridge, as viewed toward the MT unit. Pinch rollers 33 and 34, on the other hand, are disposed in positions such that they are in contact with the cartridge 4 at the right side face thereof as viewed toward the MT unit. Since the cartridge 4 has a sloped portion 4a at its right front end, pinch roller 33 is disengaged from the side face of the cartridge 4 when the cartridge is loaded in the magazine. A short time after the drive motor 35 is started, pinch roller 33 contacts the right side face of the cartridge 4. In other words, pinch rollers 32 and 34 function effectively at the beginning of the movement of the cartridge toward the MT unit, and the pinch rollers 32 and 33 function effectively at the beginning of the load-back or take-up of the cartridge into the magazine 3 after it is ejected from the MT unit. During movement of the cartridge toward the MT unit and also during movement of the cartridge back into the magazine from the MT unit, all of the pinch rollers 32, 33 and 34 function to move the tape cartridge.

Pinch rollers 32, 33 and 34 are fixed on the upper ends of shafts 43, 47 and 48, respectively, rotatably mounted to casing 1. Shafts 43, 47 and 48 have gears 42, 45 and 46, respectively, fixed thereon. Gear 42 is fixed to shaft 43 and is in mesh with a gear 40 that is further coupled with a gear 49 fixed on the output shaft of the drive motor 35. Gears 45 and 46 are fixed on shafts 47 and 48, respectively, and gears 45 and 46 mesh together with a gear 44 that is also coupled with gear 49 of drive motor 35 by means of gears 41, 39, 38 and 37. The gears in this group together form a speed reducer. As the drive motor 35 runs, pinch rollers 32, 33 and 34 rotate in directions such that a cartridge 4 is fed into the MT unit or a cartridge that has been ejected from the MT unit is taken up or loaded back into the magazine 3.

Near one end of the guide plate 19 and on the side where the pinch rollers 33 and 34 are disposed, a controller is provided to detect when a cartridge 4 has been fed from the magazine 3 toward the MT unit and also when a cartridge 4 that has been ejected from the MT unit has been taken up into the magazine 3, respectively. The controller provides an automatic stop of the drive motor 35.

Figure 6:
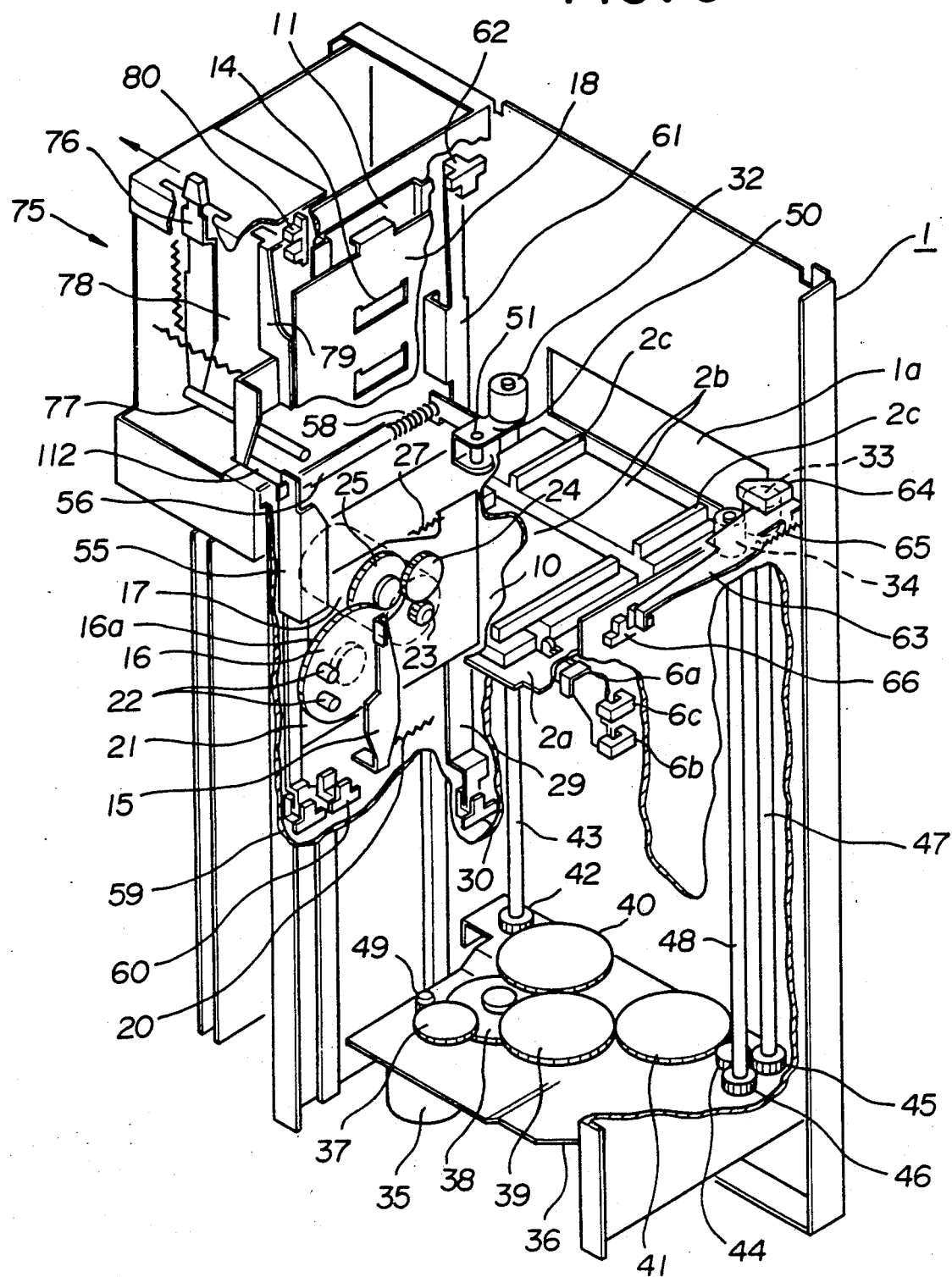
FIG. 6 is a schematic perspective view, partially in section, of the cartridge changer according to the present invention.

The drive motor stopping controller is disposed near the guide plate 19 of the casing as shown in FIGS. 6 and 10, and includes an arm 63 supported rotatably about an axis nearly parallel to the guide plate 19. A cam member 64 is fixed to one end of the arm 63 and formed with a curved face that is in contact with the slope 4a of the cartridge 4 within the rotating range of the arm 63. A coil spring 65 is provided to force the arm 63 in a direction in which the cam member 64 is in contact with the slope 4a of the cartridge 4, and a photosensor 66 detects when the other end of the arm has been rotated.

Cam member 64a is in contact with slope 4a of a cartridge 4 that rests in a position in alignment with the opening 1a. In this state, the other end of the arm 63 is out of alignment with the light emitter and photodetector of the photosensor 66 so that the photosensor is actuated. Also, when a cartridge 4 is moved from the magazine 3 toward the MT unit and when a cartridge 4 that is ejected from the MT unit is moved toward the magazine 3, arm 63 rotates clockwise and cam member 64 is in contact with the right side face of the cartridge 4. By this contact, the other end of arm 63 is in alignment with the light emitter and photodetector of the photosensor 66 so that the photosensor is not actuated. Accordingly, the stopping of the drive motor is controlled by detecting the timing of when a cartridge 4 has been fed into the MT unit out of the magazine, and of when a cartridge 4 that has been ejected from the MT unit and has been taken up or loaded back into the magazine 3 in accordance with the output of photosensor 66. Namely, drive motor 35 is stopped after the elapse of a predetermined time from when the photosensor 66 is activated.

Pinch roller 32 is rotatable in a plane nearly perpendicular to shaft 43, and in a direction in which it moves toward or away from the left side face of a cartridge 4 positioned in alignment with the inlet/outlet opening 1a of the cartridge changer. Namely, the top end of the shaft 43, being the axis of rotation of the pinch roller 32, is held by means of a bearing (not shown) at the end of a retainer 50 that is mounted for pivoted movement by a pin 51 to the casing 1, while the bottom end of the shaft 43 is movably supported in a bearing hole formed in the mount base 36. The moving distance and direction of the bottom end of the shaft 43 nearly corresponds to that of the top end thereof so that engagement between gear 42 fixed at the bottom end of the shaft 43 and the adjoining gear 40 is maintained. Therefore, as retainer 50 pivots about pin 51, and pinch roller 32 swings in a direction toward or away from the left side face of cartridge 4, the driving coupling with drive motor 35 is maintained. The mechanism for moving the pinch roller 32 is so constructed as to move the pinch roller toward and away from the left side face of the cartridge 4 that is positioned at the predetermined inlet/outlet. Furthermore, the moving of the pinch roller is interconnected or interlocked with the rotation of rotary disk 16 that moves lift 2 vertically.

The mechanism for providing the swinging or moving of pinch roller 32 into and out of engagement with cartridge 4 is described as follows with reference to FIGS. 10 and 11. The mechanism includes an arm 50' extending in a direction nearly perpendicular to a plane defined by pin 51 and shaft 43 at a position spaced from pin 51, which is the center of rotation of retainer 50. A crank lever 55 pivotably mounted on casing i with a pin 57 moves link 56 forward and backward in interconnection with the rotation of rotary disk 16. The link 56 has a reduced diameter portion that is fitted in a formed in arm 50'. The free end of the reduced diameter hole portion of link 56 is movable in relation to arm 50' in a direction in which pinch roller 32 swings toward the left side face of cartridge 4, but is not movable in relation to arm 50' in a direction in which pinch roller 32 swings away from the left side face of cartridge 4. That is, one end of link 56 is terminated by a stopper that prevents the link from pulling through the hole in the arm 50' Coil compression spring 58 is provided on the reduced-diameter portion of the link 56 between a surface at the side of pin 51 of arm 50' and the large-diameter portion of the link 56. Coil compression spring 58 forces the stopper of link 56 to engage the surface of the arm 50' at the side of pinch roller 32. Near the other end of the large-diameter portion of link 56 is a pin 56a, shown in FIG. 11, having a free end that is loosely-fitted in a hole formed in one end of crank lever 55.

Crank lever 55 has a follower portion positioned adjacent the opposite side face of rotary disk 16 from which pins 22 protrude. The follower portion of crank lever 55 is in contact with cam faces 54a and 54b of a cam member 54 formed around the axis of rotation of the disk 16. Also, a pin 53 that protrudes from the opposite side face of rotary disk 16 engages the follower portion of crank lever 55. Each time rotary disk 16 rotates one full turn, the crank lever 55 oscillates within a predetermined angle of rotation about pin 57 while being sequentially placed into contact with pin 53 and cam faces 54a and 54b, as shown in FIG. 11, to move link 56 in the direction of arrows A and B. Crank lever 55 is forced into engagement with pin 56a by the force of coil compression spring 58 acting through link 56.

Figure 11:
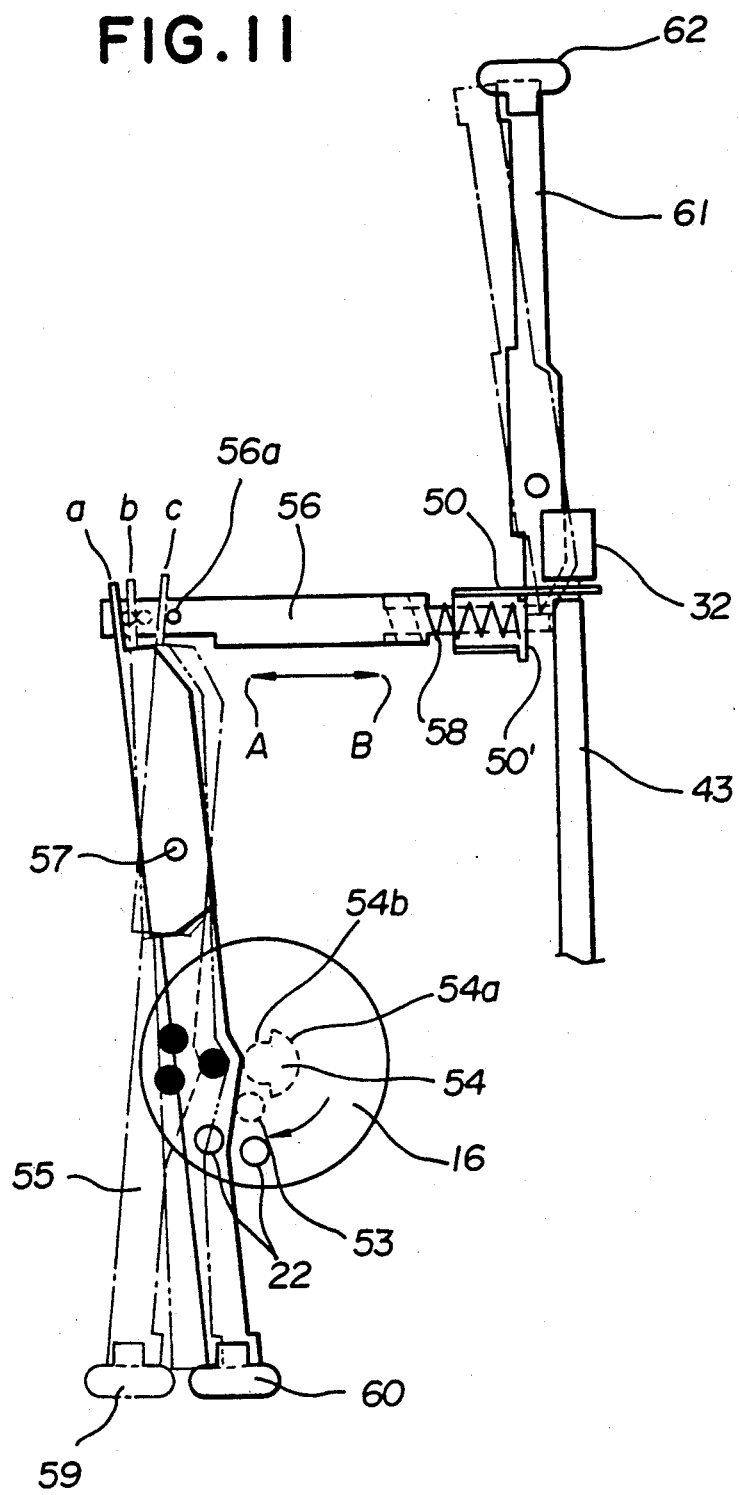
FIG. 11 is a schematic plan view of the rotary disk coupled with the crank lever and actuator during a full rotation thereof.

The position of crank lever 55 with respect to pin 53 and cam faces 54a and 54b causes crank lever 55 to move to a position a indicated with a solid line in FIG. 11 when in contact with the small-diameter cam face 54b; to a position b indicated with a double dashed line when in contact with the large-diameter cam face 54a; and to a position c indicated with a single dashed line when in contact with pin 53. As shown in FIG. 11, the position a indicated with the solid line corresponds to a position in which pin 22 of rotary disk 16 is not engaged with one of the lift steps 14 and there is no vertical movement of the lift. When rotary disk 16 rotates one full turn from this position in the direction of the arrow (in the direction of downward movement of the lift 2), crank lever 55 is oscillated by engagement with pin 53 from position a to the position c via the position b, and further oscillated back to position a via position b while engaging cam faces 54a and 54b, respectively.

As shown in FIG. 11, as crank lever 55 oscillates from position a to position c, link 56 is moved in the direction of arrow B against the force of coil compression spring 58, while arm 50' of retainer 50 held by pinch roller 32 is rotated about pin 51 until pinch roller 32 is forced by coil compression spring 58 into contact with the side face of cartridge 4. When crank lever 55 is at position c, the pins 53 and 22 take the respective positions indicated with small black circles in FIG. 11. Thus, the cartridge 4 is pinched between the pinch roller 32 and the pinch rollers 33 and 34 on the opposite side of the cartridge. At this time, since arm 50' has rotated through a predetermined angle, the stopper formed at the end of link 56 is pushed out of contact with arm 50' and is not perpendicular to link 56 and arm 50'. Also, as crank lever 55 oscillates from position c to position a, link 56 moves in the direction of arrow A under the action of coil compression spring 58 until the stopper of crank lever 55 engages the surface of arm 50' at the side of pinch roller 32. At this time, since the force of coil compression spring 58 acts at a right angle between link 56 and arm 50', the retainer 50 moves away from the side face of the cartridge 4 and pinch roller 32 is disengaged.

Photosensors 59 and 60, respectively, are provided to detect the positions c and a, respectively. Photosensors 59 and 60 detect when pinch roller 32 is in contact with cartridge 4 and when pinch roller 32 is out of contact with cartridge 4, respectively.

A detector is provided for detecting whether or not a cartridge 4 is in a position in magazine 3 in alignment with the inlet/outlet opening 1a of the changer. The detector is associated with a mechanism that rotates pinch roller 32 about pin 51. When one of the cartridges 4 is not in a position in the magazine in alignment with the inlet/outlet opening 1a, arm 50' rotates further inwardly from a position in which pinch roller 32 would normally contact the side face of a cartridge. The detector includes an actuator 61 rotatably supported on the casing 1 and a photosensor 62 that detects the movement of the actuator 61. One end of the actuator 61 is positioned within the rotating range of arm 50' while the other end is movable between positions in and out of alignment with the light emitter and photodetector of the photosensor 62.

As shown in FIG. 10, one end of the actuator 61 engages arm 50' at a position d corresponding to the position c of the crank lever 55 (the position of actuator 61 shown in solid lines in FIG. 11) while the other end of actuator 61 is positioned between the light emitter and photodetector of photosensor 62. When arm 50' further rotates through an angle 8 to a position e toward cartridge 4, the one end of the actuator 61 is rotated by engagement with arm 50' while the other end of the actuator 61 is moved away from a position in alignment with the light emitter and photodetector of the photosensor 62 (the position of actuator 61 shown by a single dashed line in FIG. 11). The actuator 61 is resiliently urged under the action of a spring in such a direction that the other end thereof is positioned between the light emitter and photodetector of the photosensor 62, and returned to its initial position under the action of the spring when arm 50' is rotated in a direction corresponding to positions a and b of crank lever 55.

When crank lever 55 is oscillated by engagement with rotary disk 16 from position c to position c via position b, arm 50' is rotated to the position b. However, when a cartridge 4 is present in magazine 3 in the position in alignment with the opening 1a, pinch roller 32 engages the left side face of the cartridge whereby arm 50' is blocked against further rotation, and actuator 61 is not moved. Thus, the other end of the actuator is positioned in alignment with the light emitter and photodetector of the photosensor 62, and it is detected that the magazine 3 has a cartridge 4 in the position aligned with the inlet/outlet opening 1a of the changer. On the other hand, when a cartridge 4 is not present in the magazine 3 in the position in alignment with the inlet/outlet opening, arm 50' is rotated further inwardly toward position e by the resilient force of coil spring 58 so that actuator 61 is rotated with arm 50' wherein the other end of the actuator is moved away from between the light emitter and photodetector of the photosensor 62 to thereby detect that no cartridge is present.

The cartridge changer according to the present invention also has a first locking member 70 disposed for each cartridge 4 that blocks the cartridges from sliding out toward the MT unit when the magazine 3 is loaded on board the magazine mount 2b of the lift. First means 71 are provided for selectively unlocking the first locking member 70 so that only a cartridge in alignment with the inlet/outlet 1a is permitted to move toward the MT unit. Further, a plurality of second locking members 72 are provided to block each cartridge 4 from sliding out of the magazine in a direction away from the MT unit. Second means 75 for collectively unlocking all of the cartridges 4 in the magazine 3 blocked by the second locking members 72 are also provided, as explained in further detail herein.

Figure 4:
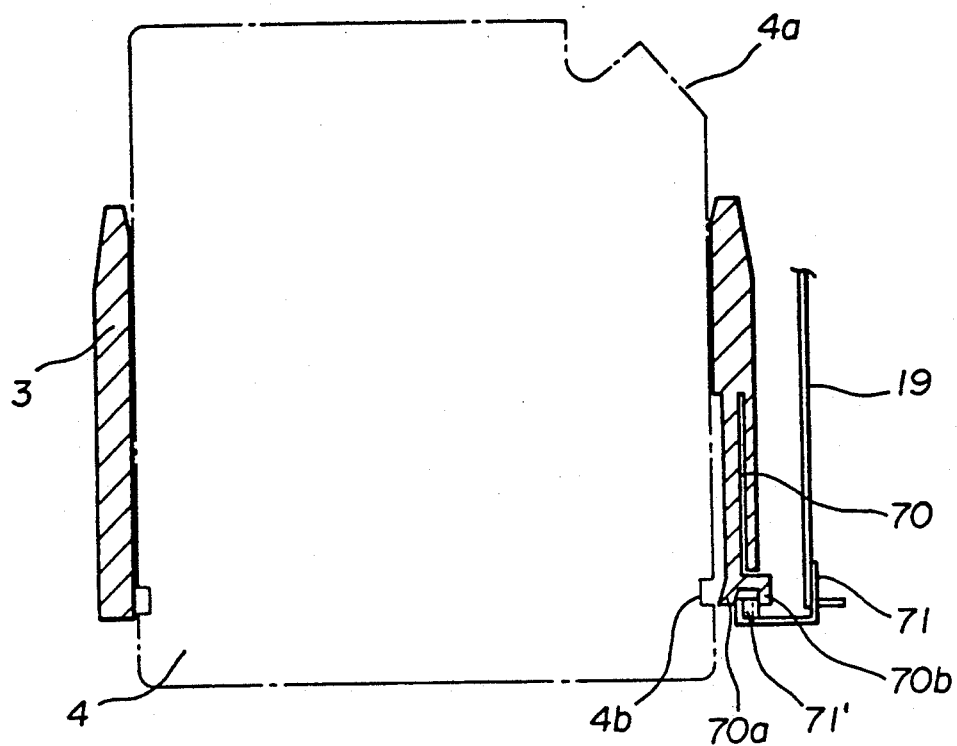
FIG. 4 is a sectional view taken along lines 4—4 in FIG. 3.
Figure 5:
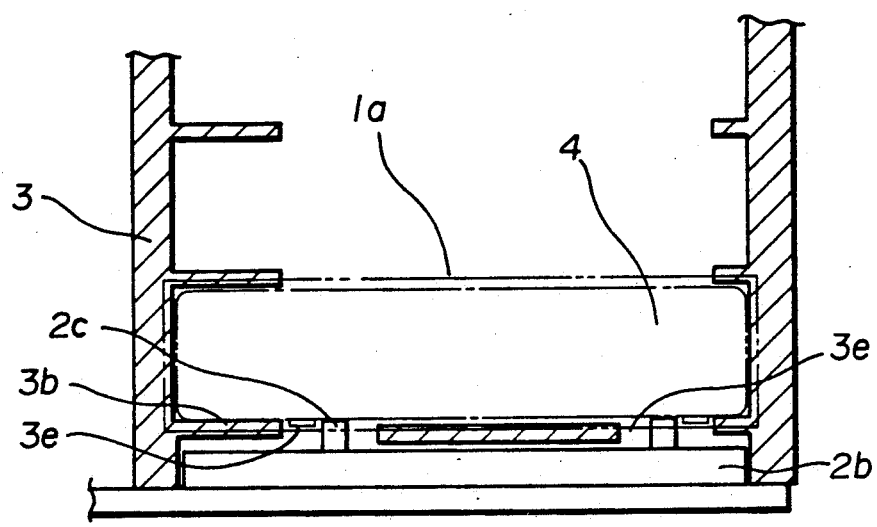
FIG. 5 is a view, partially in section, of the magazine loaded on board the magazine lift according to the present invention.
Figure 8:
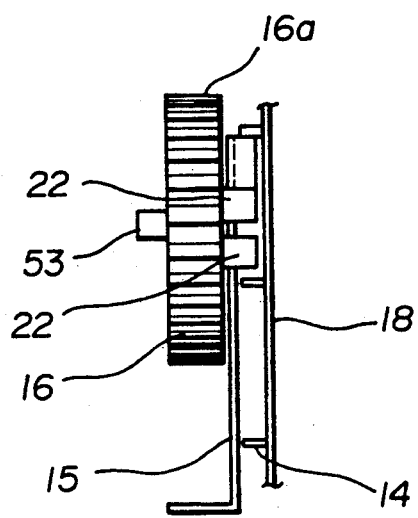
FIG. 8 is a view taken in the direction of arrow VIII in FIG. 7 showing the rotary disk, latching member and lift steps of the lift mechanism shown in FIG. 6.

First locking members 70 are disposed along the rack plates 3f, respectively, on one of the side plates 3c of the magazine 3 as shown in FIGS. 2–4. The locking members 70 are forced inwardly and have slip-out preventive pawls 70a and 70b. When each cartridge 4 is set in the magazine 3, the slip-out preventive pawl 70a is engaged in the notch 4b formed in the cartridge 4 so that the cartridge 4 in the magazine 3 is prevented from sliding out toward the MT unit.

Unlocking member 71 releases the first locking member 70 for only the cartridge currently aligned at the inlet/outlet opening 1a. Namely, the first unlocking member 71 is fixed to the guide plate 19 provided between the side plate 18 of lift 2 and the side plate 3c of the magazine 3 as shown in FIGS. 3, 4 and 10. The free end of the first unlocking member 71 is curved like a U-shape (indicated by reference numeral 71'), and has one wall that extends away from the cartridge 4 as it goes downward from the end. When the magazine is loaded onto the magazine mount 2b, the U-shaped end 71' passes through a space between the slip-out preventive pawls 70a and 70b at the side of the cartridge at the inlet/outlet to take the slip-out preventive pawl 70b away from the cartridge 4 along the U-shaped curve. This releases the first locking member 70 for only the cartridge 4 aligned at the inlet/outlet opening of the changer.

Figure 12:
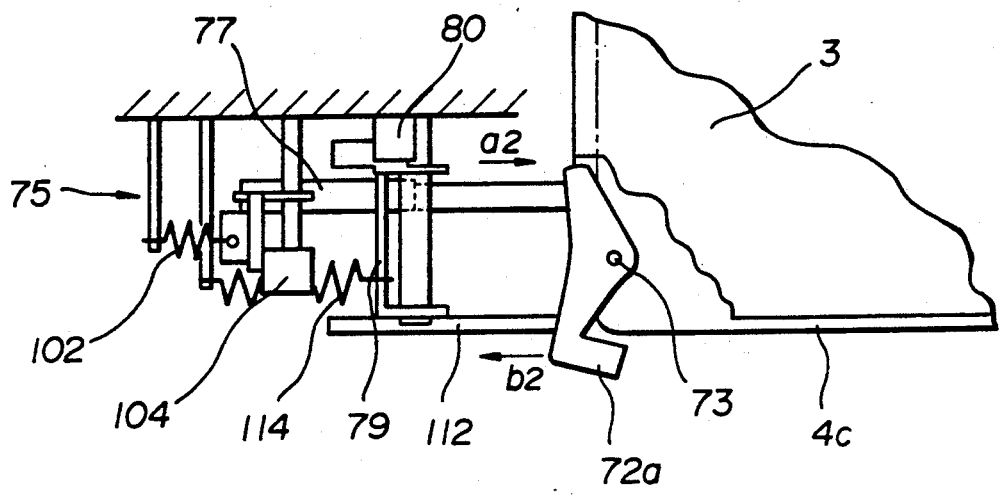
FIG. 12 is a schematic plan view of the locking mechanism that blocks the cartridges in the magazine from sliding freely out of the magazine in a direction away from the loading direction into the MT unit.
Figure 13:
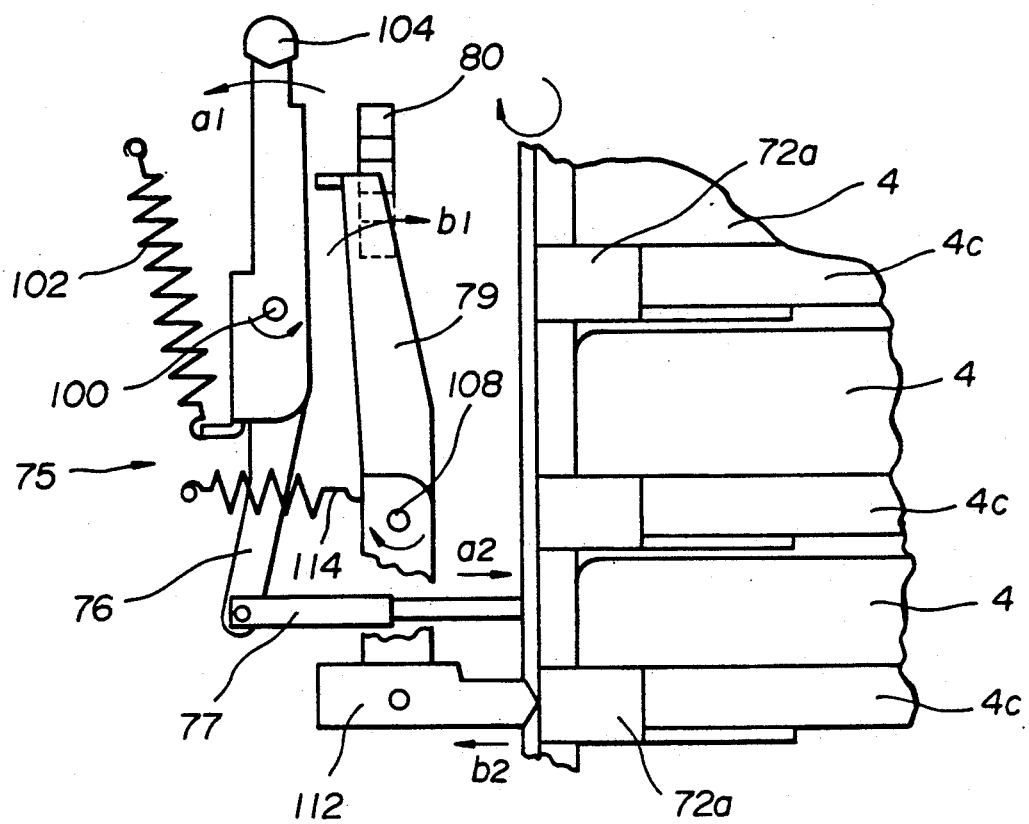
FIG. 13 is a schematic front view of the mechanisms shown in FIG. 12.

As shown in FIGS. 10, 12 and 13, the second locking member 72 is rotatably supported on a shaft 73 that is fixed to the other side plate 3c of the magazine 3. The second locking member is provided with a plurality of stoppers 72a, each corresponding to one of the cartridges 4 loaded in the magazine 3. As shown in FIG. 2, shaft 73 is forced in one direction by a torsion spring 74 so that each of the stoppers 72a is engaged with a rear end face 4c of a cartridge 4 by the resilient force of the torsion spring, thereby blocking each cartridge 4 from sliding out of the magazine in a direction away from the MT unit.

As shown in FIG. 6, 10, 12 and 13, casing 1 is provided with the above-mentioned second unlocking mechanism or means 75 for releasing the second locking member 72. FIGS. 12 and 13 show schematically the second unlocking member 75. As shown, this mechanism has an operating lever 76 that is tiltable about a shaft 100 fixed to casing 1 and having an operating knob 104 at one end thereof. A link rod 77 having one end thereof connected to the other end of the operating lever 76 is guided substantially reciprocally toward the rear end of the second locking member 72. A coil spring 102 is provided to urge the operating lever 76 in a direction in which the other end of the link rod 77 goes away from the second locking member 72. As the operator presses the operating knob 104 in the direction of the arrow a1, against the resilient force of the coil spring 102, the link rod 77 moves in the direction of arrow a2 to press the rear end of the second locking member 72. Second locking member 72 then pivots about shaft 73 against the resilient force of the torsion spring 74 so that the engagement between all of the stoppers 72a and cartridges 4 is released and the cartridges 4 can be removed from the magazine 3.

Further, there is provided in interlock or interconnection with the second unlocking mechanism 75, a means of detecting when the second locking member 72 has been released. As shown in FIGS. 12 and 13, this detecting is accomplished by a photosensor 80 actuated by one end of a sensor lever 79 that is not normally positioned to block the path between the light emitter and photodetector of the photosensor 80. A link rod 112 is coupled to the other end of the sensor lever 79 and is guided substantially reciprocally toward the front end of the second locking member 72. A coil spring 114 is provided to force the sensor lever 79 in a direction in which the other end of the link rod 112 is moved toward the second locking member 72. As a result of this arrangement, the operating lever 76 is pressed to release the locking by the second locking member 72, and the link rod 112 is forced by the second locking member 72 to move in the direction of arrow b2 against the resilient force of the spring 79. This causes sensor lever 79 to rotate in the direction of arrow b1, and thus the one end of sensor lever 79 is positioned between the light emitter and photodetector of the photosensor 80. Thus, when it is detected that any of the cartridges 4 can be removed from the magazine 3, drive motor 17 for vertical movement of the lift, and drive motor 35 for rotation of the pinch rollers is immediately stopped.

As a result of the arrangement discussed above, the operator can easily release the locking accomplished by the second locking member 72 by simply pressing the operating knob 104, and also can immediately stop the drive motor 17 for lift 2 and drive motor 35 for the pinch rollers. Then, the operator can easily take out any desired cartridge or cartridges from the magazine 3 for replacement with other cartridges.

In this embodiment of the invention, lift base 2a is provided with a partition cover assembly 7 that isolates the space under the lift base 2a from the outside of the casing 1 when the lift base 2a is raised. As seen from FIGS. 14(A) and 14(B), this partition assembly cover 7 has a first cover 7b attached to the front of the bottom plate of the lift base 2a and the lower end 7a of which is bent perpendicularly to the cover 7b. A second cover 7e having the upper end 7c thereof bent perpendicularly enables the cover 7e to be hung onto the first cover 7b. Cover 7e has a lower end 7d bent perpendicularly but in the opposite direction to the upper end 7c so that a third cover 7g having the upper end 7f thereof bent perpendicularly can be hung onto the second cover 7e. When the lift base 2a is at the lowest position L, the first through third covers 7b, 7e and 7g are horizontally aligned with each other, as shown.

As the lift base 2a rises to the initial position H, the second cover 7e moves while hanging down from the first cover 7b with the bent lower end 7a thereof supporting the bent upper end 7c of the second cover 7e. Similarly, the third cover 7g hangs down from the second cover 7e with the bent lower end 7d supporting the bent upper end 7f of the third cover 7g, so that the cover assembly thus spread out isolates the space under the lift base 2a from the outside of the casing 1.

In the casing 1, there is provided at the opposite sides of the vertical track of the lift base 2a, a compartment (not shown) that can receive the first through third covers 7b, 7e and 7g horizontally aligned with each other when the lift base 2a is at its lowest most position.

The cartridge changer according to the present invention functions in a manner explained as follows. Preferably, a mode of operation referred to as the "automatic mode of cartridge change" is followed. According to this mode, magazine 3 admits a maximum of eight cartridges 4. However, not all of the specified number of cartridges 4 needs to be inserted into the magazine 3. The cartridge change begins with the magazine being loaded into the cartridge changer by an operator. The magazine is moved upwardly so that the cartridge 4 at the lowest step or in the lowest rack of the magazine 3 is in alignment with the inlet/outlet opening 1a. Then, the loading and unloading of the cartridges is sequentially advanced until the cartridge 4 at the highest step or rack in the magazine 3 is aligned with the inlet/outlet opening of the changer. The cartridges are fed continuously one after another from the magazine 3 into the MT unit and after being ejected from the MT unit are loaded back into the magazine 3 at their same position.

When the magazine is loaded into the changer, the lift 2 is at the home position. First it is detected whether or not a cartridge 4 is in the magazine at the position in alignment with the inlet/outlet opening 1a of the changer. If it is detected that no cartridge 4 is present at this position, the lift base 2a drops one step with no cartridge change operation being conducted beforehand. At the next step, it is determined whether a cartridge 4 is present, and this operation is continued until the highest step in the magazine that is moved into position in alignment with the inlet/outlet of the changer having a cartridge 4 is detected to be present. Once a cartridge is detected as being present, lift 2 stops, and the cartridge is loaded into the MT unit and after being ejected from the MT unit is loaded back into the magazine.

The operation is explained in greater detail herein. When magazine 3 is loaded on the magazine mount 2b of lift 2 at the home position by the operator, the start switch on the control panel 5 is turned on. Thus it is detected by photosensor 6b and 6c that magazine 3 has been loaded onto mount 2b of the lift, and that lift base 2a of the lift remains at the home position. Further, photosensor 60 detects that the pinch roller 32 is out of contact with cartridge 4. Thereafter, drive motor 17 is driven to run in a direction that causes lift 2 to drop or fall. Since pin 22 on rotary disk 16 is in such a position that it does not engage lift step 14, the rotation of the drive motor 17 is converted to oscillation of crank lever 55 and to rectilinear movement of link 56. Pinch roller 32 rotates until it engages the side face of cartridge 4 by means of retainer 50. At this time, photosensor 62 detects the existence of cartridge 4 and photosensor 59 detects that pinch roller 32 is in contact with cartridge 4, whereby drive motor 17 is stopped. Thereafter, drive motor 35 is driven and the friction between pinch rollers 32, 33 and 34 and the side faces of cartridge 4 causes the cartridge to be loaded into the MT unit. Since the timing of when the cartridge 4 leaves the magazine 3 is set such that the cartridge will have left the magazine after a predetermined time has elapsed, beginning when photosensor 66 is activated, drive motor 35 is stopped, which causes pinch rollers 32, 33 and 34 to stop rotating.

After an information recording or reproduction operation is carried out with cartridge 4 in the MT unit, the cartridge 4 is ejected toward the cartridge changer from the MT unit. At this time, drive motor 35 is driven in reverse and the cartridge is loaded back into the magazine from the MT unit. When the cartridge 4 is received into the magazine 3, arm 63 having been returned to its initial position after cartridge 4 was ejected from the magazine 3 is again rotated clockwise until it touches the side face of cartridge 4, whereby photosensor 66 is activated. Thus, drive motor 35 stops after the predetermined time elapses since activation of the photosensor 66.

Figure 9:
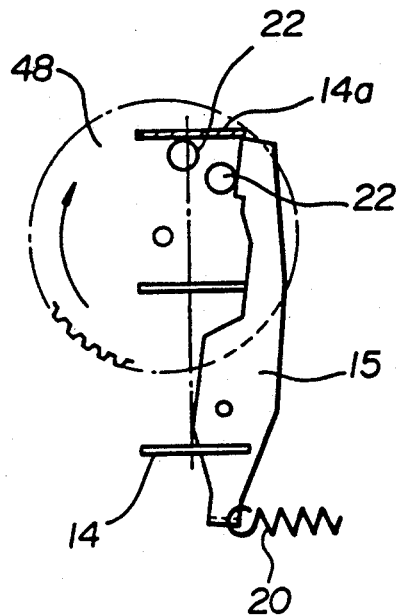
FIGS. 9(A)–(D) are explanatory views, respectively, of the stepwise vertical movement of the lift.
Figure 9:
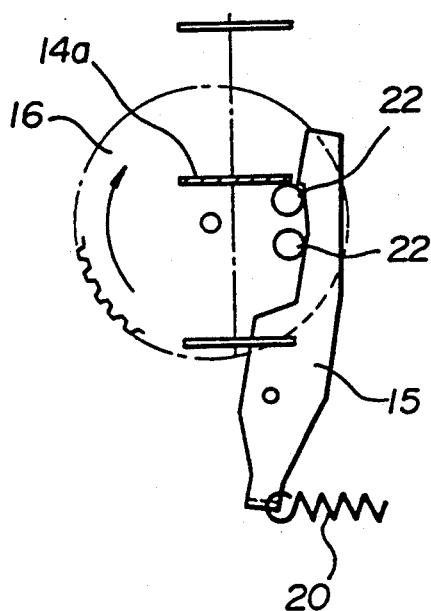
Figure 9:
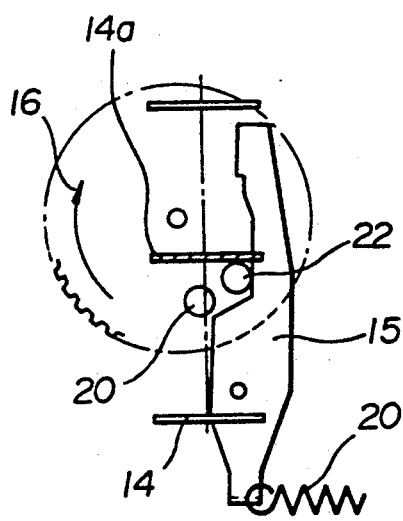
Figure 9:
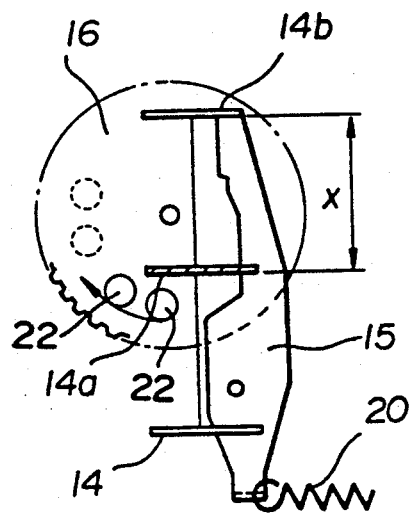

When the drive motor 35 is stopped, the drive motor 17 is driven in rotation in such a direction that the lift base 2a of the lift 2 is moved downwardly one step. The position of the pins 22 fixed to the rotary disk 16 remain as indicated by the small black circles in FIG. 11. At this time, lift step 14a for the cartridge 4 having just been received from the MT unit and loaded back into the magazine 3 is retained by the latching member 15. As the rotary disk 16 rotates one of the pins 22 is rotated downwardly while contacting the lower side of the lift step 14a and moving it downwardly. Meanwhile, the other pin 22 is rotated downwardly while pressing the latching member 15 in such a direction that it disengages with lift step 14a. Thus, lift step 14a gradually goes down (see FIGS. 9(A) and 9(B)). As rotary disk 16 rotates further, the pin 22 that has been pressing the latching member 15 rotates further downwardly while being in contact with the latching member 15 (see FIG. 9(C)) and the lift step 14a falls until the latching member 15 engages the lift step 14b corresponding to the cartridge 4 set in the second step or rack plates of the magazine 3 (see FIG. 9(D)). The positions that the pins 22 take just after the lift step 14a has fallen by one pitch X are shown in FIG. 9(D). Also, after the latching member 15 engages lift step 14b, rotary disk 16 continuously rotates so that crank lever 55 takes position a when pins 22 take the positions indicated with solid lines, shown in FIG. 9(D), which is understood from a comparison with FIG. 11. When the pins 22 rotate from the positions indicated with solid lines in FIG. 9(D) to the positions indicated with dashed lines, the crank lever 55 pivots from the position a to the position c. This pivoting of the crank lever 55 is converted to swing pinch roller 32 so that it will move toward the side face of the cartridge 4 as has been described and the photosensors 62 and 59 will detect that a cartridge 4 to be fed into the MT unit is present in the magazine and that the pinch roller 32 is in contact with the side face thereof. Thereby, the rotary disk 16 stops rotating, and the drive motor 35 for rotating the pinch rollers 32, 33 and 34 is driven to load cartridge 4 into the MT unit. Also, when photosensor 62 detects that a next cartridge 4 to be loaded into the MT unit is not present in the magazine 3, rotary disk 16 continues to rotate without stopping to perform a tape change, and lift 2 drops to another step.

When the cartridge change has been completed for all of the cartridges 4 at the first through eighth steps, lift base 2a of the lift 2 is at the lower limit position L. Thereafter, as rotary disk 16 is rotated in the opposite direction, lift base 2a is raised stepwise to the initial position H and a sequence of operations is over. Thus, the automatic mode of cartridge change is completed by merely turning on the start switch on the control panel 5 after the magazine 3 containing the plurality of cartridges 4 is loaded onto the cartridge mount of the lift 2.

There has been described in the foregoing, a drive motor 35 for rotating the pinch rollers and a drive motor 17 for vertically moving the lift base 2a, which can be run in various modes of operations. These operations can be carried out by using a microprocessor to control the signals in accordance with whether predetermined photosensors are activated or not.

What is claimed is:

1. A cartridge-type magnetic tape changer having a magazine that contains a plurality of magnetic tape cartridges supported in said magazine in regularly spaced intervals by cartridge holders, in which the cartridges are sequentially loaded through ann inlet/outlet of the changer into a magnetic tape unit for recording/reproduction of information and thereafter ejected from the magnetic tape unit and loaded back into the magazine, comprising:

lifting means for receiving and guiding said magazine in a first plane of movement adjacent said inlet/outlet to selectively position said cartridge holders and corresponding cartridges in alignment with said inlet/outlet;

lifting driving means for moving said lifting means in said first plane in stepwise movement wherein each step of movement traverses a predetermined distance extending between two successive ones of the cartridge holders in said magazine;

means interconnected with the movement of said lifting driving means for detecting whether a cartridge is supported in a predetermined cartridge holder positioned in alignment with said inlet/outlet of the changer;

means for moving said cartridges in a second plane perpendicular to said first plane when one of said cartridges is in a corresponding one of the cartridge holders positioned in alignment with said inlet/outlet of the tape changer, including loading said one cartridge into said magnetic tape unit and loading said one cartridge back into said one cartridge holder of said magazine after being ejected from said magnetic tape unit; and said lifting driving means being for driving said lifting means said predetermined distance in said first plane after said moving means loads said one cartridge into said magnetic tape unit and back into sad magazine from said magnetic tape unit, and said lifting means being further for moving said lifting means said predetermined distance when said detecting means detects that any of the cartridge holders positioned in alignment with said inlet/outlet does not have a corresponding one of the cartridges supported therein.

2. The cartridge-type magnetic tape changer according to claim 1, wherein said lifting means further includes a rail mounted on the changer and extending in the direction of the plane of movement of the lifting means and a plurality of rollers mounted for rolling engagement with said guide rail.

3. The cartridge-type magnetic tape changer according to claim 1, wherein said means for moving said cartridges in a second plane includes at least two motor-driven pinch rollers engaging opposite side faces, respectively, of said cartridges; one of said pinch rollers being mounted on an arm at one end of the arm, the arm being pivotally mounted to the changer at a midportion thereof; means interconnected with the movement of said lifting driving means for pivoting said arm about said pivot to move said one of said pinch roller in directions toward and in contact with one of said opposite side faces of said cartridges and away from said one side of said cartridges according to whether or not said lifting means is moved in said first plane by said lifting driving means.

4. The cartridge-type magnetic tape changer according to claim 3, wherein said pivoting means comprises a main cam projecting outwardly from another face of said rotary disk, a crank lever oscillated by means of said main cam, and a link member moved substantially linearly by means of said crank lever and which is resiliently coupled to said arm member, said main cam oscillating said crank lever between a first position obtained by movement of said one pinch roller in the direction away from said one cartridge side and a second position obtained by movement of said one pinch roller in the direction toward said one cartridge side; and means for resiliently urging said arm in the direction of movement of said one pinch roller toward said one cartridge side to a third position beyond said second position only when any one of the cartridge holders positioned in alignment with said inlet/outlet does not have a corresponding one of the cartridges supported therein.

5. A cartridge-type magnetic tape changer according to claim 4, further comprising said detecting means having a photosensor actuating arm having means for engaging and detecting the pivoting movement of said arm member and being operably coupled to a first photosensor, wherein when said arm member pivots to said third position, said activating arm detects the movement of said arm member and activates said first photosensor to provide an output; and means receiving the output of said first photosensor and for controlling the driving of said rotary disk in accordance with the output of said first photosensor so that said lifting means is moved in said first plane by said predetermined distance when the output of said first photosensor is received.

6. The cartridge-type magnetic tape changer according to claim 5, further comprising a second photosensor for detecting and providing an output when said crank lever is in said second position, and means receiving the output of each of said first and second photosensors for controlling the driving of said pinch rollers so that said cartridge is moved toward said magnetic tape unit when the output of said first photosensor is not received and when the output of said second photosensor is received.

7. The cartridge-type magnetic tape changer according to claim 1, wherein said lifting means includes a mount on which said magazine is loaded when said magazine is received by said lifting means, said magazine mount having at least two flat-topped protrusions extending parallel to each other and spaced a distance apart from one another corresponding to the width of the cartridges so that said magazine mount receives one of a magazine and a cartridge loaded thereon, wherein a cartridge loaded on said magazine mount fits between said protrusions and a magazine loaded thereon has notches corresponding to said protrusions so that when said magazine is loaded on said magazine mount, said top surfaces extend through said notches to be at a substantially equal level to that of the surface of a bottom plate of said magazine.

8. The cartridge-type magnetic tape changer according to claim 1, further including said magazine having a plurality of rack plates as said cartridge holders and a plurality of first locking members for each of said rack plates, respectively, that block each cartridge from moving out of said magazine toward said magnetic tape unit; and first unlocking means for selectively releasing the first locking member of any of said cartridges in a corresponding said cartridge holder in alignment with said inlet/outlet of the changer.

9. The cartridge-type magnetic tape changer according to claim 8, wherein said first locking member comprises a resilient pawl member, and each said cartridge has a recess formed in one of the sides for receiving said resilient pawl member, and said first unlocking means being for disengaging said pawl member from said recess against a force of said resilient pawl member.

10. The cartridge-type magnetic tape changer according to claim 8, wherein said first locking member comprises a resilient pawl member, and each said cartridge has a recess formed in one of the sides for receiving said resilient pawl member, and aid first locking means being for disengaging said pawl member from said recess against a force of said resilient pawl member.

11. A cartridge-type magnetic tape changer having a magazine that contains a plurality of magnetic tape cartridges supported in said magazine in regularly spaced intervals by cartridge holders, in which the cartridges are sequentially loaded through an inlet/outlet of the changer into a magnetic tape unit for recording/reproduction of information and thereafter ejected from the magnetic tape unit and loaded back into the magazine, comprising:
lifting means for receiving and guiding said magazine in a first plane of movement adjacent said inlet/outlet to selectively position said cartridge holders and corresponding cartridges in alignment with said inlet/outlet;
lifting driving means for moving said lifting means in said first plane in stepwise movement wherein each step of movement traverses a predetermined distance extending between two successive ones of when cartridge holders in said magazine;
means interconnected with the movement of said lifting driving means for detecting whether a cartridge is supported in a predetermined cartridge holder positioned in alignment with said inlet/outlet of the changer;
means for moving said cartridges in a second plane perpendicular to said first plane when one of said cartridges is in a corresponding one of the cartridge holders positioned in alignment with said inlet/outlet of the tape changer, including loading said one cartridge into said magnetic tape unit and loading said one cartridge back into said one cartridge holder of said magazine after being ejected from said magnetic tape unit;
said lifting driving means being for driving said lifting means said predetermined distance in said first plane after said moving means loads said one cartridge into said magnetic tape unit and back into said magazine from said magazine tape unit, and said lifting driving means being further for moving said lifting means said predetermined distance when said detecting means detects that any of the cartridge holders positioned in alignment with said inlet/outlet does not have a corresponding one of the cartridges supported therein; and
said lifting driving means further including said lifting means having a side plate extending in said first plane and having a plurality of lift steps protruding laterally outwardly therefrom that are spaced apart from one another by the interval of spacing between each of said cartridge holders in said magazine; a releasable latching member and means for resiliently urging said releasable latching member to engage said lift steps; means for moving said releasable latching member and for moving said lift steps including a motor-driven rotary disk having means protruding from a face of the rotary disk for engaging and disengaging said latching member and said lift steps each time said rotary disk rotates through a predetermined angle, said engaging and disengaging means of said latching member and lift step moving means engaging and releasing said latching member from engagement with one of said lift steps and engaging and moving one of said lift steps by said predetermined distance in said first plane, and then disengaging from said one of said lift steps and said latching member so that said urging means moves said latching member into engagement with another of said lift steps.

12. The cartridge-type magnetic tape changer according to claim 11, wherein said means for moving said cartridges in a second plane includes at least two motor-driven pinch rollers engaging opposite side faces, respectively, of said cartridges; one of said pinch rollers being mounted on an arm at one end of the arm, the arm being pivotally mounted to the changer at a midportion thereof; means interconnected with the movement of said lifting driving means for pivoting said arm about said pivot to move said one of said pinch roller in directions toward and in contact with one of said opposite side faces of said cartridges and away from said one side face f said cartridges according to whether or not said lifting means is moved in said first plane by said lifting driving means.

13. The cartridge-type magnetic tape changer according to claim 11, wherein said latching member and lift step engaging and disengaging means of said means for moving said releasable latching member and said lift steps comprises two pins protruding from said face of the rotary disk, wherein one of said pins engages and releases said latching member from engagement with one of said lift steps while the other of said pins engages and supports in movement said one of said lift steps until said one of said pins is disengaged from said latching member and said latching member engages another of said lift steps.

14. The cartridge-type magnetic tape changer according to claim 11, wherein said first plane of movement is a vertical plane and wherein said second plane of movement is a horizontal plane.

15. The cartridge-type magnetic tape changer according to claim 11, wherein said first plane of movement is a vertical plane and wherein said second plane of movement is a horizontal plane.

16. A cartridge-type magnetic tape changer having a magazine that contains a plurality of magnetic tape cartridges supported in said magazine in regularly spaced intervals by cartridge holders, in which cartridges are sequentially loaded through an inlet/outlet of the changer into a magnetic tape unit for recording/reproduction of information and thereafter ejected from the magnetic tape unit and loaded back into the magazine, comprising:

lifting means for receiving and guiding said magazine in a first plane of movement adjacent said inlet/outlet to selectively position said cartridge holders and corresponding cartridges in alignment with said inlet/outlet;

lifting driving means for moving said lifting means in said first plane in stepwise movement wherein each step of movement traverses a predetermined distance extending between two successive ones of the cartridge holders in said magazine;

means interconnected with the movement of said lifting driving means for detecting whether a cartridge is supported in a predetermined cartridge holder positioned in alignment with said inlet/outlet of the changer;

means for moving one of said cartridges in a second plane perpendicular to said first plane when said one cartridge is in a corresponding one of the cartridge holders positioned in alignment with said inlet/outlet of the tape changer, including loading said one cartridge into said magnetic tape unit and loading said one cartridge back into sad one cartridge holder of said magazine after being ejected from said magnetic tape unit;

said lifting driving means being for driving said lifting means said predetermined distance in said first plane after said moving means loads said one cartridge into said magnetic tape unit and back into said magazine from said magazine tape unit, and said lifting driving means being further for moving said lifting means said predetermined distance when said detecting means detects that any of the cartridge holders positioned inn alignment with said inlet/outlet does not have a corresponding one of the cartridges supported therein;

said magazine having a plurality of rack plates forming said cartridge holders and a plurality of first locking members mounted adjacennt each of said rack plates along one side of said magazine, each for block a corresponding one of said cartridges from moving toward said magnetic tape unit, and a first unlocking means for selectively releasing said first locking member of any of said cartridges positioned in a corresponding said rack plate that is in alignment with said inlet/outlet of said changer; and second locking means opposite said one side of said magazine and adjacent each of said rack plates for blocking movement of said cartridges in a direction extending away from said magnetic tape unit from a rear side of said magazine, said second locking means including a plurality of stoppers each being rotatably mounted on a side plate of said magazine and having an end portion engaging a corresponding rear end face of said cartridges, and a resilient member for urging each of said stoppers into engagement with the rear end face of said cartridge, respectively, and a second unlocking means for rotating said second locking means against the force of said resilient member to collectively release the engagement between each of said stoppers and said cartridges, respectively.

17. The cartridge-type magnetic tape changer according to claim 16, further comprising a photosensor for detecting and producing an output when the engagement between each of said plural stoppers and said rear end faces of said cartridges, respectively, is released; means receiving the output of said photosensor for controlling said lifting driving means and said means for moving said cartridges in a second plane, whereby said controlling means stops said lifting driving means and said means for moving said cartridges in a second plane when said output of said photosensor is received.

18. The cartridge-type magnetic tape changer according to claim 16, further comprising a photosensor for detecting and producing an output when the engagement between each of said plural stoppers and said rear end faces of said cartridges, respectively, is released; means receiving the output of said photosensor for controlling said lifting driving means and said means for moving said cartridges in a second plane, whereby said controlling means stops said lifting driving means and said means for moving said cartridges in a second plane when said output of said photosensor is received.

19. A cartridge-type magnetic tape changer having a magazine that contains a plurality of magnetic tape cartridges supported in said magazine in regularly spaced intervals by cartridge holders in which the cartridges are sequentially loaded through an inlet/outlet of the changer into a magnetic tape unit for recording/reproduction of information and thereafter ejected from the magnetic tape unit and loaded back into the magazine, comprising:

lifting means for receiving and guiding said magazine in a first plane of movement adjacent said inlet/outlet to selectively position said cartridge holders and corresponding cartridges in alignment with said inlet/outlet;

lifting driving means for moving said lifting means in said first plane in stepwise movement wherein each step of movement traverses a predetermined distance extending between two successive ones of the cartridge holders in said magazine;

means interconnected with the movement of said lifting driving means for detecting whether a cartridge is supported in a predetermined cartridge holder positioned in alignment with said inlet/outlet of the changer;

means for moving said cartridges in a second plane perpendicular too said first plane when one of said cartridges is in a corresponding one of the cartridge holders positioned in alignment with said inlet/outlet of the tape changer, including loading said one cartridge into said magnetic tape unit and loading said one cartridge back into said one cartridge holder of said magazine after being ejected from said magnetic tape unit;

said lifting driving means being for driving said lifting means said predetermined distance in said first plane after said moving means loads said one cartridge into said magnetic tape unit and back into said magazine from said magazine tape unit, and said lifting driving means being further for moving said lifting means said predetermined distance when said detecting means detects that any of the cartridge holders positioned in alignment with said inlet/outlet does not have a corresponding one of the cartridges supported therein;

said lifting driving means further including said lifting means having a side plate extending in said first plane and having a plurality of lift steps protruding laterally outwardly therefrom that are spaced art from one another by the interval of spacing between each of said cartridge holders in said magazine; a releasable latching member and means for resiliently urging said releasable latching member to engage said lift steps; means for moving said releasable latching member and for moving said lift steps including a motor-driven rotary disk having means protruding from a face of the rotary is for engaging and disengaging said latching member and said lift steps each time said rotary disk rotates through a predetermined angle, said engaging and disengaging means of said latching member and lift step moving means engaging and releasing said latching member from engagement with one of said lift steps and engaging and moving one of said lift steps by said predetermined distance in said first plane, and then disengaging from said one of said lift steps and said latching member so that said urging means moves said latching member into engagement with another of said lift steps; and said means for moving said cartridges in a second plane including at least two motor-driven pinch rollers engaging opposite side faces, respectively, of said cartridges; one of said pinch rollers being mounted on an arm at one end of the arm, the arm being pivotally mounted to the changer at a midportion thereof; means interconnected with the movement of said lifting driving means for pivoting said arm about said pivot to move said one of said pinch roller in directions toward and in contact with one of said opposite side faces of said cartridges away from said one side face of said cartridges according to whether or not said lifting means is moved in said first plane by said lifting driving means.

20. The cartridge-type magnetic tape changer according to claim 19, wherein said pivoting means comprises a main cam projecting outwardly from another face of said rotary disk, a crank lever oscillated by means of said main cam, and a link member moved substantially linearly by means of said crank lever and which is resiliently coupled to said arm member, said main cam oscillating said crank lever between a first position obtained by movement of said one pinch roller in the direction away from said one cartridge side and a second position obtained by movement of said one pinch roller in the direction toward said one cartridge side; and means for resiliently urging said arm in the direction of movement of said one pinch roller toward said one cartridge side to a third position beyond said second position only when any one of the cartridge holders positioned in alignment with said inlet/outlet does not have a corresponding one of the cartridges supported therein.

21. A cartridge-type magnetic tape changer according to claim 20, further comprising said detecting means having a photosensor actuating arm having means for engaging and detecting the pivoting movement of said arm member and being operably coupled to a first photosensor, wherein when said arm member pivots to said third position, said activating arm detects the movement of said arm member and activates said first photosensor to provide an output; and means receiving the output of said first photosensor and for controlling the driving of said rotary disk in accordance with the output of said first photosensor so that said lifting means is moved in said first plane by said predetermined distance when the output of said first photosensor is received.

22. The cartridge-type magnetic tape changer according to claim 21, further comprising a second photosensor for detecting and providing an output when said crank lever is in said second position, and means receiving the output of each of said first and second photosensors for controlling the driving of said pinch rollers so that said cartridge is moved toward said magnetic tape unit when the output of said first photosensor is not received and when the output of said second photosensor is received.

23. The cartridge-type magnetic tape changer according to claim 19, wherein said latching member and lift step engaging and disengaging means of said means for moving said releasable latching member and said lift steps comprises two pins protruding from said face of the rotary disk, wherein one of said pins engages and releases said latching member from engagement with one of said lift steps while the other of said pins engages and supports inn movement said one of said lift steps until said one of said pins is disengaged from said latching member and said latching member engages another of said lift steps.

24. The cartridge-type magnetic tape changer according to claim 19, wherein said first plane of movement is a vertical plane and wherein said second plane of movement is a horizontal plane.

25. A cartridge-type magnetic tape changer having a magazine that contains a plurality of magnetic tape cartridges supported in said magazine in regularly spaced intervals by cartridge holders, in which the cartridges are sequentially loaded through an inlet/outlet of the changer into a magnetic tape unit for recording/reproduction of information and thereafter ejected from the magnetic tape unit and loaded back into the magazine, comprising:

lifting means for receiving and guiding said magazine in a first plane of movement adjacent said inlet/outlet to selectively position said cartridge holders and corresponding cartridges in alignment with said inlet/outlet;

lifting driving means for moving said lifting means in said first plane in stepwise movement wherein each step of movement traverses a predetermined distance extending between two successive ones of the cartridge holders in said magazine;

means interconnected with the movement of said lifting driving means for detecting whether a cartridge is supported in a predetermined cartridge holder positioned in alignment with said inlet/outlet of the changer;

means for moving said cartridges in a second plane perpendicular to said first plane when one of said cartridges is in a corresponding one of the cartridge holders positioned in alignment with said inlet/outlet of the tape changer, including loading said one cartridge into said magnetic tape unit and loading said one cartridge back into said one cartridge holder of said magazine after being ejected from said magnetic tape unit;

said lifting driving means being for driving said lifting means said predetermined distance in said first plane after said moving means loads said one cartridge into said magnetic tape unit and back into said magazine from said magnetic tape unit, and said lifting driving means being further for moving said lifting means said predetermined distance when said detecting means detects that any of the cartridge holders positioned in alignment with said inlet/outlet does not have a corresponding one of the cartridges supported therein;

said lifting driving means further including said lifting means having a side plate extending in said first plane and having a plurality of lift steps protruding laterally outwardly therefrom that are spaced apart from one another by the interval of spacing between each of said cartridge holders in said magazine; a releasable latching member and means for resiliently urging said releasable latching member to engage said lift steps; means for moving said releasable latching member and for moving said lift steps including a motor-driven rotary disk having means protruding from a face of the rotary disk for engaging and disengaging said latching member and said lift steps each time said rotary disk rotates through a predetermined angle, said engaging and disengaging means of said latching member and lift step moving means engaging and releasing said latching member from engagement with one of said lift steps and engaging and moving one of said lift steps by said predetermined distance in said first plane, and then disengaging from said one of said lift steps and said latching member so that said urging means moves said latching member into engagement with another of said lift steps; and said lifting means including a mount on which said magazine is loaded when said magazine is received by said lifting means, said magazine mount having at least two flat-topped protrusions extending parallel to each other and spaced a distance apart from one another corresponding to the width of the cartridges so that said magazine mount receives one of a magazine and a cartridge loaded thereon, wherein a cartridge loaded on said magazine mount fits between said protrusions and a magazine loaded thereon has notches corresponding to said protrusions so that when said magazine is loaded on said magazine mount, said top surfaces extend through said notches to be at a substantially equal level to that of the surface of a bottom plate of said magazine.

26. A cartridge-type magnetic tape changer having a magazine that contains a plurality of magnetic tape cartridges supported in said magazine regularly spaced intervals by cartridge holders, in which the cartridges are sequentially loaded through an inlet/outlet of the changer into a magnetic tape unit for recording/reproduction of information and thereafter ejected from the magnetic tape unit and loaded back into the magazine, comprising:

lifting means for receiving and guiding said magazine in a first plane of movement adjacent said inlet/outlet to selectively position said cartridge holders and corresponding cartridges in alignment with said inlet/outlet;

lifting driving means for moving said lifting means in said first plane inn stepwise movement wherein each step of movement traverses a predetermined distance extending between two successive ones of the cartridge holders in said magazine;

mean interconnected with the movement of said lifting driving means for detecting whether a cartridge is supported in a predetermined cartridge holder positioned in alignment with said inlet/outlet of the changer;

means for moving said cartridges in a second plane perpendicular to said first plane when one of said cartridges is in a corresponding one of the cartridge holders positioned in alignment with said inlet/outlet of the tape changer, including loading said one cartridge into said magnetic tape unit and loading said one cartridge back into said one cartridge holder of said magazine after being ejected from said magnetic tape unit;

said lifting driving means being for driving said lifting means said predetermined distance in said first plane after said moving means loads said one cartridge into said magnetic tape unit and back int said magazine from said magnetic tape unit, and said lifting driving means being further for moving said lifting means said predetermined distance when said detecting means detects that any of the cartridge holders positioned in alignment with said inlet/outlet does not have a corresponding one of the cartridges supported therein;

said lifting driving means further including said lifting means having a side plate extending in said first plane and having a plurality of lift steps protruding laterally outwardly therefrom that are spaced apart from one another by the interval of spacing between each of said cartridge holders in said magazine; a releasable latching member and means for resiliently urging said releasable latching member to engage said lift steps; means for moving said releasable latching member and for moving said lift steps including a motor-driven rotary disk having means protruding from a face of the rotary disk for engaging and disengaging said latching member and said lift steps each time said rotary disk rotates through a predetermined angle, said engaging and disengaging means of said latching member and lift step moving means engaging and releasing said latching member from engagement with one of said lift steps and engaging and moving one of said lift steps by said predetermined distance in said first plane, and then disengaging from said one of aid lift steps and said latching member so that said urging means moves said latching member into engagement with another of said lift steps; and said magazine having a plurality of rack plates as said cartridge holders and a plurality of first locking members for each of said rack plates, respectively, that block each cartridge from moving out of said magazine toward said magnetic tape unit; and first unlocking means for selectively releasing the first locking member of any of said cartridges in a corresponding said cartridge holder in alignment with said inlet/outlet of the changer.

27. The cartridge-type magnetic tape changer according to claim 26, wherein said latching member and lift step engaging and disengaging means of said means for moving said releasable latching member and said lift steps comprises two pins protruding from said face to the rotary disk, wherein one of said pins engages and releases said latching member from engagement with one of said lift steps while the other of said pins engages and supports in movement said one of said lift steps until said one of said pins is disengaged from said latching member and said latching member engages another of said lift steps.

28. A cartridge-type magnetic tape changer having a magazine that contains a plurality of magnetic tape cartridges supported in said magazine in regularly spaced intervals by cartridge holders, in which the cartridges are sequentially loaded through an inlet/outlet of the changer into a magnetic tape unit for recording/reproduction of information and thereafter ejected from the magnetic tape unit and loaded back into the magazine, comprising;

lifting means for receiving and guiding said magazine in a first plane of movement adjacent said inlet/outlet to selectively position said cartridge holders and corresponnding cartridges in alignment with said inlet/outlet;

lifting driving means for moving said lifting means in said first plane in stepwise movement wherein each step of movement traverses a predetermined distance extending between two successive ones of the cartridge holders in said magazine;

means interconnected with the movement of said lifting driving means for detecting whether a cartridge is supported in a predetermined cartridge holder positioned in alignment with said inlet/outlet of the changer;

means for moving one of said cartridges in a second plane perpendicular to said first plane when said one cartridge is in a corresponding one of the cartridge holders positioned in alignment with said inlet/outlet of the tape changer, including loading said one cartridge into said magnetic tape unit and loading aid one cartridge back into said one cartridge holder of said magazine after being ejected from said magnetic tape unit;

said lifting driving means being for driving said lifting means said predetermined distance in said first plane after said moving means loads said one cartridge into said magnetic tape unit and back into said magazine from said magnetic tape unit, and said lifting driving means being further roar moving said lifting means said predetermined distance when said detecting means detects that any of the cartridge holders positioned in alignment with said inlet/outlet does not have a corresponding one of the cartridges supported therein;

said magazine having a plurality of rack plates forming said cartridge holders and a plurality of first locking members mounted adjacent each of said rack plates along one side of said magazine, each for blocking a corresponding one of said cartridges from moving toward said magnetic tape unit, and a first unlocking means for selectively releasing said first locking member of any of said cartridges positioned din a corresponding said rack plate that is in alignment with said inlet/outlet of said changer; and second locking means opposite said one side of said magazine and adjacent each of said rack plates for blocking movement of said cartridges inn a direction extending away from said magnetic tape unit from a rear side of said magazine, said second locking means including a plurality of stoppers each being rotatably mounted on a side plate of said magazine and having an end portion engaging a corresponding rear end face of said cartridges, and a resilient member for urging each of said stoppers into engagement with the rear end face of said cartridges, respectively, end a second unlocking means for rotating said second locking means against the force of said resilient member to collectively release the engagement between each of said stoppers and said cartridges, respectively.

29. The cartridge-type magnetic tape changer according to claim 28, wherein said first plane of movement is a vertical plane and wherein said second plane of movement is a horizontal plane.

* * * * *